United States Patent [19]

McCormick

[11] 4,167,899

[45] Sep. 18, 1979

[54] DISPOSABLE UNITARY COFFEE MAKER

[76] Inventor: James B. McCormick, 505 N. Lakeshore Dr., Chicago, Ill. 60611

[21] Appl. No.: 823,955

[22] Filed: Aug. 12, 1977

[51] Int. Cl.² .............. A47J 31/057; A47J 31/10; A47J 31/30; A23F 1/08
[52] U.S. Cl. ................................. 99/302 R; 99/316
[58] Field of Search ............... 99/279, 282, 283, 289, 99/292, 293, 295, 296, 298, 300, 302, 303, 290, 316, 317, 321, 322; 220/270; 16/126, 114 A; 137/74; 126/348, 369

[56] References Cited

U.S. PATENT DOCUMENTS

| | | | |
|---|---|---|---|
| 132,450 | 10/1872 | Darnell | 16/126 |
| 2,570,997 | 10/1951 | Willman | 99/303 |
| 3,269,402 | 8/1966 | Horner | 137/74 |
| 3,445,237 | 5/1969 | Gidge | 99/295 |
| 3,493,002 | 2/1970 | Brugler et al. | 137/74 |
| 3,667,643 | 6/1972 | Patel | 220/270 |
| 3,757,670 | 9/1973 | Laama et al. | 99/302 R |
| 3,972,273 | 8/1976 | Carlson et al. | 99/300 |

Primary Examiner—Harvey C. Hornsby
Assistant Examiner—Timothy F. Simone
Attorney, Agent, or Firm—Fitch, Even & Tabin

[57] ABSTRACT

A disposable unitary coffee maker is disclosed which includes similarly shaped top and bottom portions having cooperating annular flanges secured together in fluid-tight relation with a pump element interposed therebetween. The pump element encloses a coffee charge through which purified water from the bottom portion passes when heated. A fuse element prevents flow of water through the coffee charge until the water reaches a predetermined temperature at which time the heated water flows through the coffee charge into the top portion for pouring through a spout opening defined by a pull tab; a handle being provided to facilitate handling.

9 Claims, 3 Drawing Figures

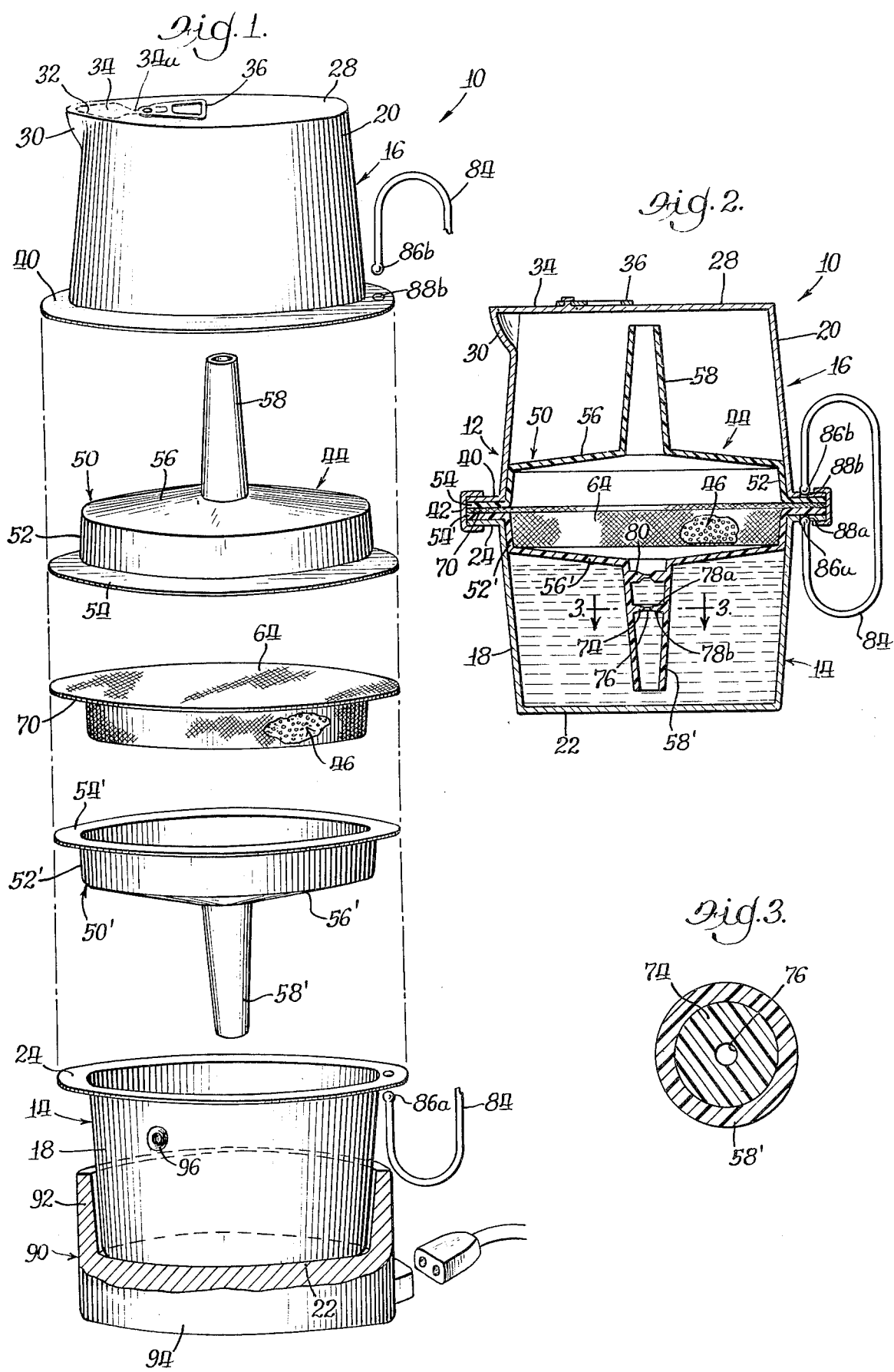

DISPOSABLE UNITARY COFFEE MAKER

The present invention relates generally to coffee makers, and more particularly to a novel disposable unitary coffee maker which is particularly suitable for making "expresso" coffee.

Recent innovations in cooking techniques and equipment have popularized gourmet cooking, this being particularly so among persons priding themselves in their ability to prepare foods in a manner not ordinarily practiced in the average kitchen. In addition to the many gourmet foods which are presently favored as entrees and the like, "expresso" coffee has also become a much more desirable product in gourmet cooking. "Expresso" coffee is a rich, concentrated coffee product which is generally made in relatively small servings. The techniques presently known for making "expresso" coffee in the average American gourmet kitchen are relatively cumbersome and generally leave an undesirable mess in the kitchen.

With the price of coffee presently increasing at a rate which makes coffee almost a luxury item, the need for eliminating any waste as well as providing a highly flavored expresso coffee is particularly desirable.

The present invention recognizes the need for an improved coffee maker for making "expresso" coffee which is simple in operation and which eliminates the messiness of presently known techniques. Accordingly, one of the primary objects of the invention is to provide an improved covffee maker particularly adapted for making "expresso" coffee in an efficient and economical manner.

The greatest variable in the preparation, i.e. brewing, of expresso or other brewed, percolated, extracted or similar beverages is the quality of water used. Another object of the present invention is to provide an improved coffee maker particularly adapted for making expresso coffee wherein water of predetermined highly pure quality is sealed within a portion of the coffee maker so that a high quality expresso is assured irrespective of where the expresso is brewed.

Still another object of the present invention is to provide a disposable unitary coffee maker having a sealed bottom portion containing a quantity of pure water which when heated effects opening of a temperature or pressure responsive fuse plug to facilitate passage of the heated water through a coffee charge after which the coffee rises to a top portion preparatory to pouring.

A feature of the disposable unitary coffee maker in accordance with the present invention lies in the provision of an internally sealed pump having an associated flow rate choke which regulates the flow of heated water through a coffee charge so as to obtain a desired time exposure of the coffee charge to the heated water, and wherein different chokes may be provided within different coffee makers to provide different coffee "strengths".

Another feature of the present invention lies in the provision of a disposable unitary coffee maker having a tab seal formed integral with a top portion of the coffee maker and selectively releasable to define a pouring spout.

Further objects, features and advantages of the present invention, together with the organization and manner of operation thereof, will become apparent from the following detailed description of the invention taken in conjunction with the accompanying drawing wherein like reference numerals designate like elements throughout the several views, and wherein:

FIG. 1 is an exploded perspective view of a disposable unitary coffee maker constructed in accordance with the present invention, the bottom portion being shown in cooperation with a heater base;

FIG. 2 is a longitudinal sectional view of the coffee maker of FIG. 1 but shown in assembled relation; and FIG. 3 is an enlarged fragmentary transverse sectional view taken substantially along the lines 3—3 of FIG. 2, looking in the direction of the arrows.

Referring now to the drawing, a coffee maker constructed in accordance with the present invention is indicated generally at 10. The coffee maker 10 has a unitary assembled construction and is intended as a disposable coffee maker facilitating disposal after a single use. The coffee maker 10 includes container housing means, indicated generally at 12, having a base or bottom pot portion 14 and a top pot portion 16. The bottom and top pot portions 14 and 16 have substantially identical configurations except for a pouring spout on the top portion 16 as will be described more fully hereinbelow.

In the illustrated embodiment, the bottom and top pot portions 14 and 16 have frusto-conical peripheral side walls, indicated at 18 and 20, respectively. The bottom pot portion 14 has a circular bottom wall 22 formed integral with the frusto-conical peripheral side wall 18 so as to define a reservoir adapted to contain a predetermined quantity of purified liquid, such as approximately 8-12 fluid ounces of "perfect pure water", which will ultimately be heated to form the coffee brew. The upper edge of the wall 18 defines an open upper end of the bottom portion 14 and terminates in an outwardly directed circumferential flange 24 which lies in a plane substantially perpendicular to the longitudinal axis of the bottom pot portion 14, as best seen in FIG. 2.

The top pot portion 16 has an upper substantially planar end wall 28 formed integral with the upper edge of the frusto-conical side wall 20 and defines therewith an internal chamber in the top pot having a volumetric capacity substantially equal to the capacity of the lower portion 14, such as approximately 8-12 fluid ounces.

The upper edge of the peripheral wall 20 is formed outwardly at 30 to define a pouring spout. The upper wall 28 adjacent the pouring spout 30 has a closed line of weakness or tear line 32 formed therein which defines a releasable seal tab 34 integral with but removable from the upper end wall 28. A finger pull tab 36 is secured to an end area 34a tab of the seal tab 34 and normally lies against the upper end wall 28. The pull tab 36 may be grasped by one's finger and pulled upwardly to tear the seal tab 34 from the top 28 just prior to heating of the water in the bottom pot 14 so as to prevent undesirable pressure build-up during operation of the coffee maker 10, as will be described hereinbelow.

The lower edge of the peripheral wall 20 of the top pot portion 16 terminates in an outwardly directed circumferential flange 40 which lies in a plane substantially normal to the longitudinal axis of the top pot portion and is of equal size to the circumferential flange 24 on the bottom pot portion 14. In this manner, the bottom and top pot portions 14 and 16 are adapted to be assembled with the flanges 24 and 40 disposed in opposed mating relation as shown in FIG. 2. During assembly, an annular rim seal 42 is secured about the mating peripheral edges of the flanges 24 and 40 to maintain the top and bottom pan portions in liquid-tight sealed relation. The bottom and top pot portions 14 and 16 are preferably made of a suitable metallic material compatible with coffee making, such as aluminum. The rim seal 42 may also be metallic and applied as by rolling peripherally about the mating edges of the flanges 24 and 40 in a known manner.

The coffee maker 10 includes pump means, indicated generally at 44, mounted between and internally of the bottom and top pot portions 14 and 16. The pump means 44 is adapted to contain a coffee charge, indicated generally at 46, internally thereof, and is operative to effect the flow of heated water from the lower pot 14 upwardly through the coffee charge when the water is heated to a predetermined temperature. To this end, the pump means 44 includes substantially identically shaped upper and lower portions 50 and 50' which may be made of liquid impervious molded plastics such as polypropylene or a suitable acrylonitrile polymer or copolymer. The upper and lower pump portions 50 and 50' include frusto-conical walls 52 and 52', respectively, which are formed integral with annular radial flanges 54 and 54', as best seen in FIG. 2. The frusto-conical walls 52' and 52 preferably are sized to snugly engage the inner surfaces of the walls 18 and 20, respectively, when in assembled relation therewith. The walls 52 and 52' are formed integral with frusto-conical shaped walls 56 and 56' having frusto-conical shaped tubular extensions 58 and 58', respectively, formed integrally and centrally thereof such that the axes of the tubes 58 and 58' are coincident with the corresponding axes of revolution of the peripheral walls 52 and 52'. The tubular extensions 58 and 58' are of sufficient length, respectively, to extend upwardly within the upper pot portion 16 substantially to the upper end wall 28, and downwardly within the reservoir in the bottom pot portion 14 substantially to the bottom wall 22 when the upper and lower pump portions 50 and 50' are assembled between the flange 24 and 40 of the bottom and top pot portions 14 and 16, as best seen in FIG. 2.

In assembled relation, the upper and lower pump portions 50 and 50' define an internal cavity or chamber adapted to receive the coffee charge 46 therein. In the illustrated embodiment, the coffee charge 46 comprises a "cake" of a coffee composition suitable to produce the desired "expresso" coffee. Coffee mixtures which provide the desired rich concentrated "expresso" taste are known and commercially available. The coffee "cake" is press sealed within a liquid pervious holder wrapper 64 which preferably comprises a commercially available nonwoven synthetic filter fabric. The coffee charge 46 has a vertical thickness and peripheral configuration which facilitates snug fitting of the coffee charge within the peripheral wall 52' of the lower pump portion 50'. The coffee holder wrap 64 has a circumferential flange 70 adapted to be received between the opposed flanges 54 and 54' when assembled in fixed relation.

With reference to FIGS. 2 and 3, the depending tube 58' of the lower pump portion 50' has a fluid flow control choke 74 mounted therein to control the rate of flow of water upwardly through the coffee charge during a coffee making cycle so as to obtain the desired time exposure of the coffee charge to the heated water. To this end, the flow control choke 74 has a circular passage 76 therethrough centrally of conical upper and lower surfaces 78a and 78b and of a predetermined size sufficient to provide the desired flow rate. The flow control choke 74 may be made of a suitable plastic material such as polypropylene which can be heat secured within the depending flow tube 58'.

The depending tubular extension 58' of the pump means 44 also supports a circular fuse plug 80 therein axially spaced above the flow control choke 74. The fuse plug 80 has its peripheral edge suitably secured to the interior surface of the flow tube 58' and may be of a type adapted to melt when the temperature of the water within the bottom pan portion 14 reaches a predetermined temperature, such as 200° F., or may be of a type sufficient to be expelled upwardly from the flow tube 58' when the pressure acting on the underside of the fuse plug reaches a predetermined value corresponding to a desired water temperature such as approximately 200° F.

With the lower pump portion 50' having circumferential engagement through its annular flange 54' with the flange 24 of the lower pot 14, and having the fuse plug 80 in its tubular extension 58', it will be appreciated that the water within the lower pot is sealed therein. In this manner, the quality of pure water used in brewing the expresso coffee can be readily controlled whereby a high quality expresso is assured irrespective of where the coffee maker 10 is used.

The coffee maker 10 has a handle 84 pivotally mounted on the container means 12 for movement between a position lying generally flat against the container pot portions 14 and 16, and an outward position facilitating gripping by one's hand for manipulation of the coffee maker. The handle 84 may be mounted on the container means 12 in any suitable manner. In the illustrated embodiment, the handle 84 is made from a relatively stiff wire rod formed into a C-shape to define end portions 86a and 86b which are received within suitable recesses 88a and 88b in the flanges 24 and 40, respectively, so as to facilitate pivotal movement of the handle 84.

The bottom pot portion 14 of the coffee maker is adapted to be received within a base heater, indicated generally at 90, which includes an upstanding circumferentially extending wall 92 terminating at its lower edge in a circular base 94. As seen in FIG. 2, the upstanding wall 92 is inclined slightly outwardly relative to the base 94 to nest with the lower portion of the side wall 18. The base 94 includes a suitable electrical resistance heating element (not shown) operative when energized to heat the contents of the bottom pot 14 in a known manner. The heating element may comprise a 110 v.a.c. 1000 watt resistance type adapted to rapidly heat the water within the bottom container 14 to its boiling point. Preferably, a thermoelectric switch (not shown) is connected in circuit with the heating element to open the heating circuit when the heating element reaches a temperature of approximately 250° F. indicating that all the water from the bottom pot 14 has transferred to the top pot 16 through the coffee charge 46. A conventional pressure or temperature fuse 96 is mounted in the side wall 18 of the lower pot 14, as shown in FIG. 1, and is adapted to open at a predetermined pressure within the lower pot, thus serving as a safety pressure relief fuse for the coffee maker in a known manner.

In operation, the bottom portion 14 of the coffee maker 10 is placed within the heater 90. The seal tab 34 is then removed from the upper end wall 28 by pulling the pull tab 36, as is known. Preferably, a notice is imprinted on the bottom pot 14 indicating that the seal 34 must be removed before heating the water. The heater 90 is then energized to heat the water within the bottom container portion 14. When the water reaches a predetermined temperature, such as approximately 200° F., the fuse plug 80 melts away from the inner surface of the flow tube 58' or is expelled upwardly from the flow tube 58' by the pressure acting on its underside when the water temperature reaches approximately 200° F., whereafter the heater water flows upwardly through the coffee charge 46 due to the pressure differential between the bottom and top pot portions 14 and 16. In effect, there is a siphoning action acting on the water in the bottom pot 14 through the pump 44. The coffee brew passes upwardly through the upper flow passage 58 whereafter the brewed coffee is retained within the upper container pot portion 16 for subsequent pouring.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. A disposable unitary coffee maker comprising, in combination, a base portion defining a reservoir having an open upper end defined by a circumferentially extending flange, a top portion having similar size configuration to said base portion and having an internal chamber, said top portion having an open lower end in communication with said internal chamber and defining a circumferentially extending flange, a predetermined quantity of purified water enclosed within said reservoir, means permanently securing said circumferentially extending flanges together in liquid-tight relation so that said internal chamber in said top portion is disposed above said reservoir, pump means including a pair of substantially identically shaped pump housing sections having mutually cooperable circumferential flanges thereon interposed between said flanges defined by said base and top portion and having circumferential sealing relation with said base and top portions, said pump housing sections being mounted so as to establish upper and lower pump housing sections which separate said reservoir from said internal chamber and define a coffee charge receiving chamber therebetween, the lower one of said housing sections having a tubular portion communicating with said charge chamber and extending downwardly within said purified water, the upper one of said pump housing sections having a tubular portion extending upwardly within said internal chamber in said top portion, a coffee charge having a circumferential flange interposed and captured between said circumferential flanges of said pump housing sections so as to be permanently disposed within said charge chamber, said coffee charge being adapted for snug fitting relation within said pump housing sections such that heating said water to a predetermined temperature effects flow of water through said pump means and through said coffee charge, and a heat fuse disposed within said tubular portion of said lower one of said housing sections to prevent flow of water from said base portion through said coffee charge until said water is heated to a predetermined temperature of approximately 200° F., said top portion defining a normally closed selectively openable pouring spout facilitating pouring of liquid from said top portion.

2. A disposable unitary coffee maker as defined in claim 1 including a flow control choke disposed within said tubular portion of said lower one of said pump housing sections and operative to establish a predetermined rate of water flow through said coffee charge.

3. A disposable coffee maker as defined in claim 1 including a handle mounted on at least one of said base and top portions and movable between a position disposed substantially against the peripheral surface of the coffee maker and a position extending outwardly therefrom for grasping by one's hand.

4. A disposable coffee maker as defined in claim 1 wheren said circumferentially extending flanges lie in planes disposed substantially perpendicular to the axes of the associated base and top portions and are secured together in fluid-tight sealing relation by a circumferentially extending rim seal.

5. A disposable coffee maker as defined in claim 1 wherein said base portion has a generally frusto-conical outer configuration adapted to seat within a heating unit.

6. A disposable coffee maker as defined in claim 1 wherein said top portion has an upper generally planar surface, and including a pouring spout opening in said upper surface defined by an integrally formed removeable tab.

7. A disposable coffee maker as defined in claim 6 wherein said removable tab is defined by a line of weakness in said upper planar surface, and including a pull tab connected to said removable tab to facilitate removal of said tab.

8. A disposable coffee maker as defined in claim 1 wherein said coffee charge includes a nonwoven synthetic carrier element adapted to facilitate passage of water therethrough, and including a quantity of ground coffee disposed within said synthetic carrier such that water passed through said carrier effects formulation of a liquid coffee brew which flows to said internal chamber through said upwardly extending tubular portion of said pump means.

9. A disposable coffee maker as defined in claim 1 including a pressure relief fuse mounted on said base portion.

* * * * *